H. A. KENDALL.
APPARATUS FOR MAKING NITROCELLULOSE.
APPLICATION FILED MAR. 6, 1919.
1,410,814.
Patented Mar. 28, 1922.
4 SHEETS—SHEET 1.
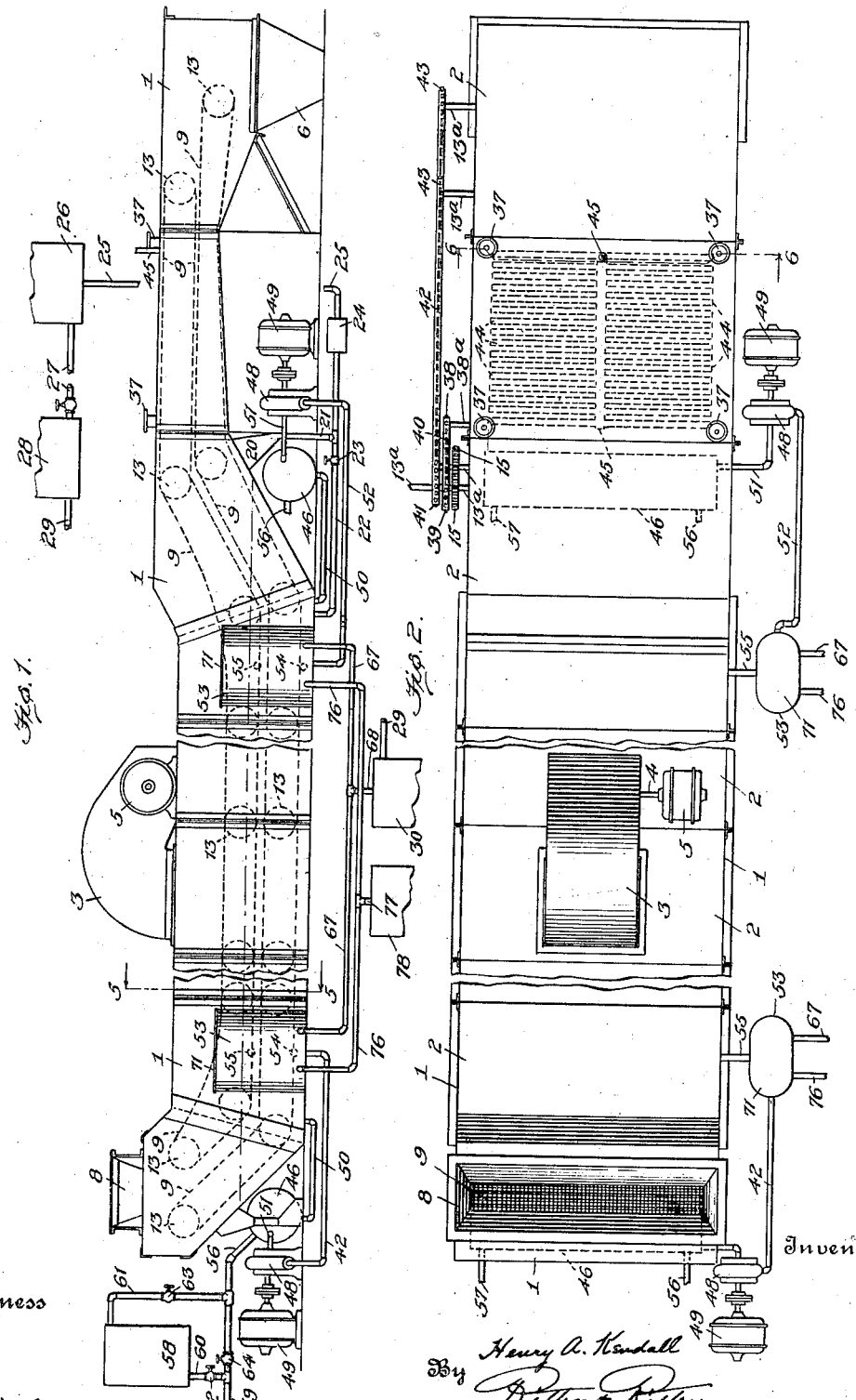

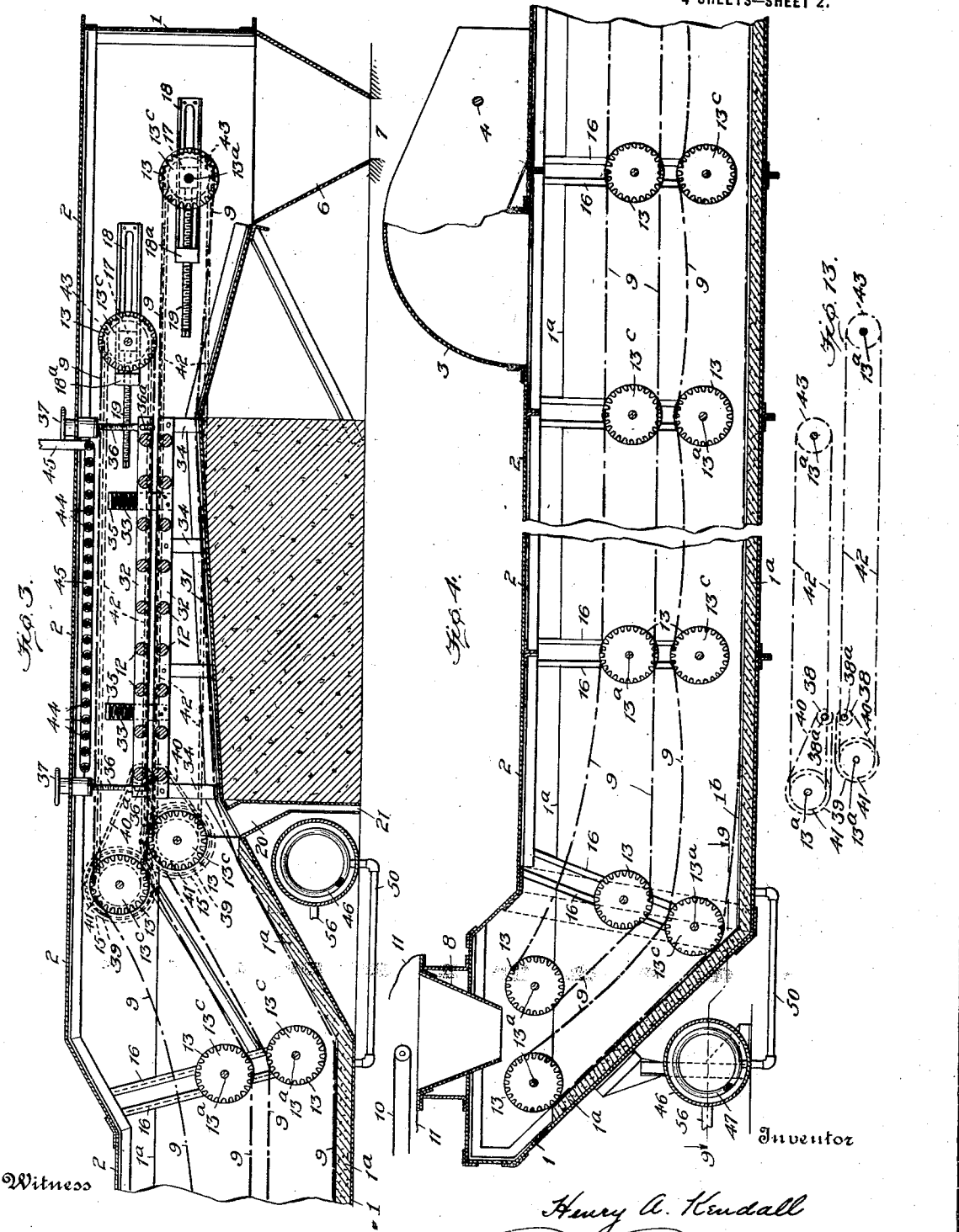

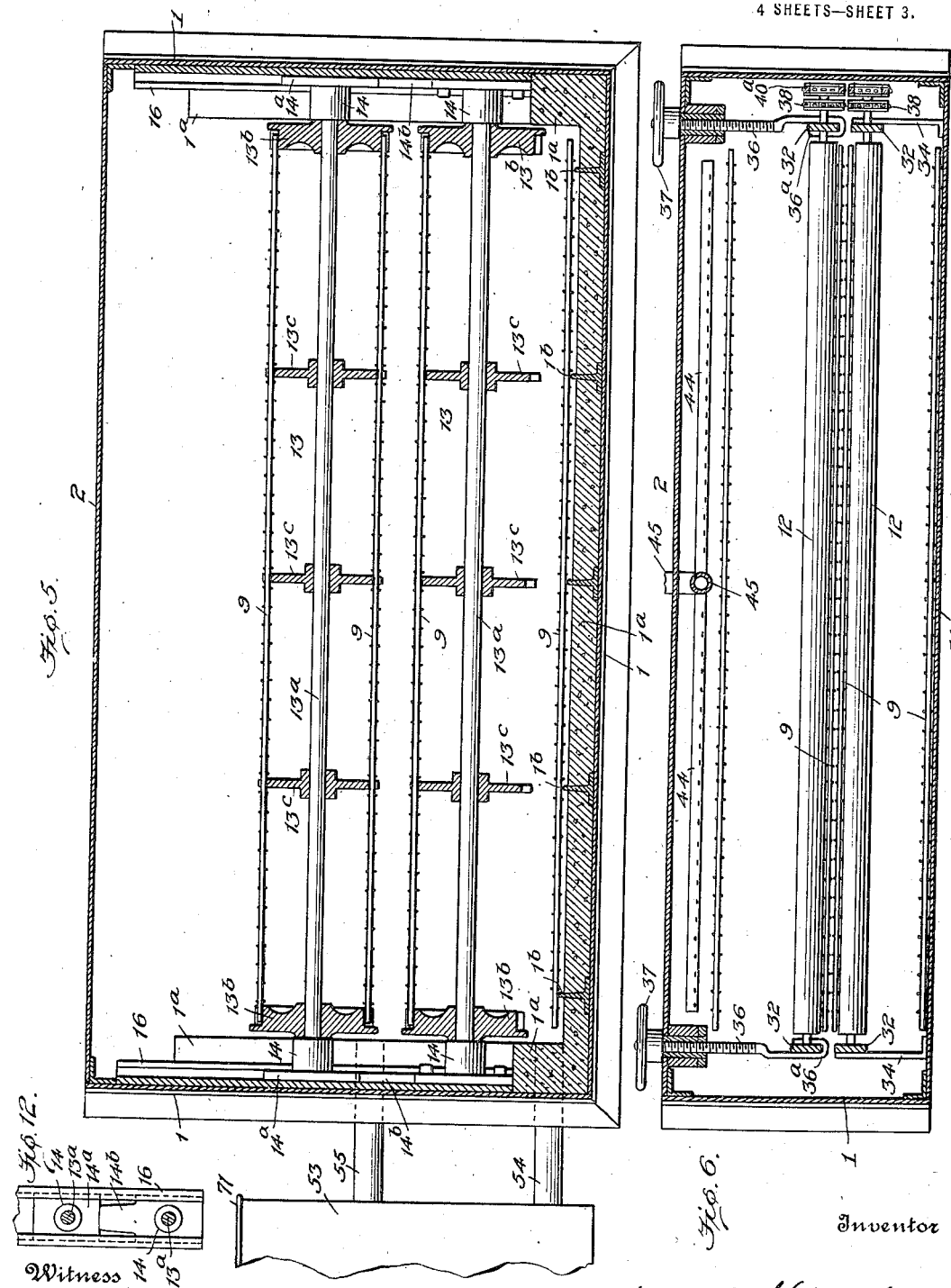

H. A. KENDALL.
APPARATUS FOR MAKING NITROCELLULOSE.
APPLICATION FILED MAR. 6, 1919.
1,410,814.
Patented Mar. 28, 1922.
4 SHEETS—SHEET 4.
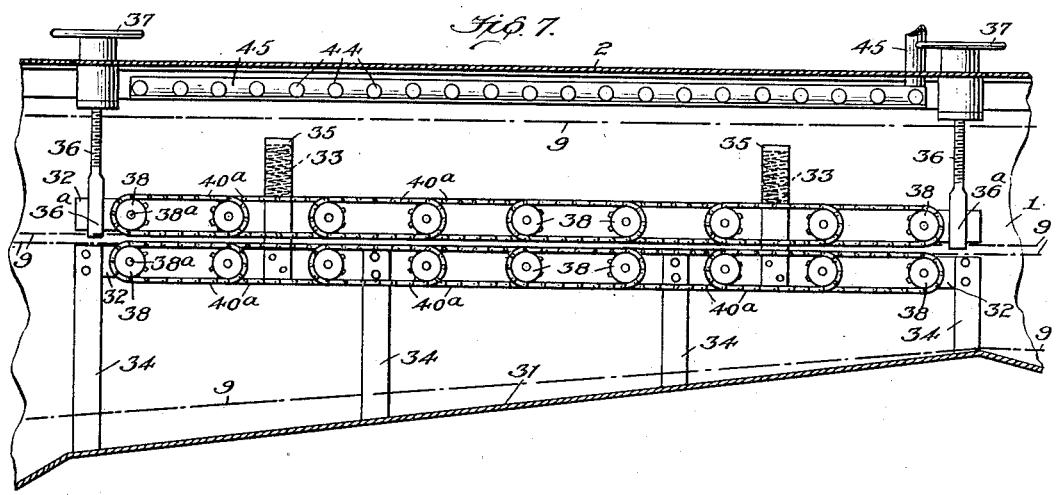
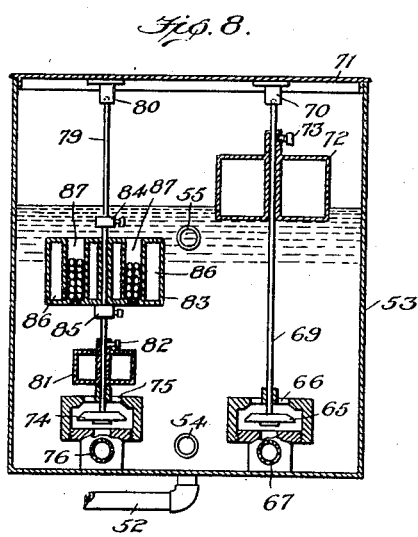
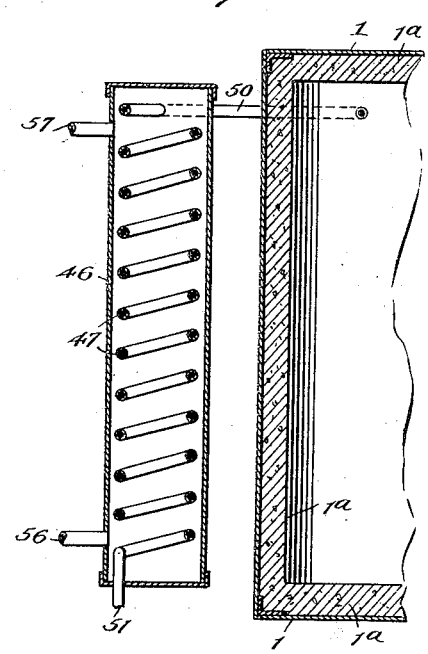
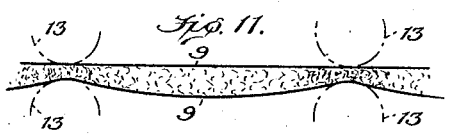
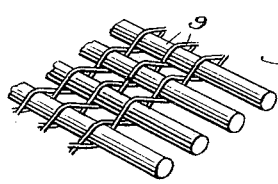
Inventor
Henry A. Kendall
Witness
Edwin L. Bradford
By 
His Attorneys

UNITED STATES PATENT OFFICE.

HENRY A. KENDALL, OF BALTIMORE, MARYLAND.

APPARATUS FOR MAKING NITROCELLULOSE.

1,410,814.     Specification of Letters Patent.     Patented Mar. 28, 1922.

Application filed March 6, 1919. Serial No. 280,949.

*To all whom it may concern:*

Be it known that I, HENRY A. KENDALL, a citizen of the United States, residing at the city of Baltimore, State of Maryland, have invented certain new and useful Improvements in Apparatus for Making Nitrocellulose; and I do hereby declare the following to be a full, clear, and exact description of the invention, such as will enable others skilled in the art to which it appertains to make and use the same.

My invention relates to apparatus for nitrating cotton or other cellulose material in a manner promoting rapid, safe, uniform and economical production of a large output. There are many broadly novel features of invention, both in respect to the relation and coordination of mechanisms for automatically regulating and controlling the conditions of efficient nitration and in respect to the structure and mode of operation of various parts of the apparatus. Among these novel features and advantages the following may be referred to in general terms before the apparatus is described in detail: (1) The material to be nitrated is progressively passed through the acid while supported from beneath, thus allowing the cotton dust, which averages about eight per cent and which at present is not used, to be carried in with the cotton linters and nitrated as readily as long fiber linters. (2) During nitration the material being acted upon by the acid is subjected to a kneading action or alternate compressions and expansions, thus causing constant change of the acid acting on the material, with a resulting increase in rapidity of nitration. (3) The temperature of the acid in the tank or bath where nitration occurs is controlled by withdrawing acid of nitration from the tank, passing it through means for regulating its temperature to the desired degree, and thereafter returning it to the tank. (4) Means are provided for automatically maintaining the acid in the nitration tank at such predetermined constant volume or level as may be appropriate to the quantity of material subjected to the acid. (5) The strength of the acid in the nitration tank is maintained at the desired point by mechanism responding to variations in the specific gravity of the acid so as to admit a fortifying medium in the quantity requisite to maintain the acid in the nitration tank at the proper strength or density. (6) Nitration and wringing of the nitrated cotton are continuous operations and are effected in a closed or substantially closed tank or receptacle, thus controlling fumes and practically eliminating them as far as workmen are concerned, minimizing the possibility of fume-offs or fires, making fume reclamation more profitable, and rendering the operation of the apparatus independent of atmospheric conditions.

While it is preferred to incorporate in the apparatus all of these novel and advantageous features, as well as others of minor importance which will be hereinafter described, it is obvious that it is within the will of the constructor to omit some of them if the advantages incident to their use are sacrificed.

In the drawings illustrating the preferred form of apparatus for practicing my invention, the scope whereof is pointed out in the claims, Figure 1 is a side elevation of the apparatus, intermediate parts of the nitration tank being omitted and certain adjunctive devices being illustrated diagrammatically.

Figure 2 is a plan view of the construction shown in Figure 1, the temperature regulating water heater, acid fortifying medium supply tank, mixed acid supply tank, spent acid receiving tank and acid refortification apparatus or unit being omitted.

Figure 3 is a detail central section of the delivery end of the apparatus, showing the relative arrangement of the acid bath, the wringer rollers, the quenching sump inlet, and the endless belts for conveying the cotton through the acid bath and wringer rolls to the inlet of the quenching sump, the conveyor belts being indicated by dot and dash lines.

Figure 4 is a detail central section of the inlet end of the apparatus and of an intermediate portion showing the fume control exhaust, the conveyor belts or aprons for the cotton being indicated by dot and dash lines.

Figure 5 is a detail section on the line 5—5, Figure 1.

Figure 6 is a detail section on the line 6—6, Figure 2.

Figure 7 is a detail vertical section of a portion of the apparatus, the section being taken just inside of the side wall of the tank and disclosing the quenching spray and the means for adjusting and driving the wringer rolls, the belt conveyors being indicated by dot and dash lines.

Figure 8 is a detail vertical section of one of the mechanisms for automatically regulating the volume and strength of the acid bath in which the cotton is treated.

Figure 9 is a detail section on the line 9—9, Figure 4.

Figure 10 is a detail perspective view showing the preferred construction of the endless belts for conveying the cotton through the acid bath.

Figure 11 is a diagrammatic view illustrating the kneading action or alternate squeezings and expansions to which the cotton is subjected as the belts by which it is conveyed pass from one pair of sprocket supports to another.

Figure 12 is a detail sectional view showing the manner of mounting the bearings of the sprocket supports for the endless belt conveyors.

Figure 13 is a diagrammatic view of a portion of the driving mechanism for the conveyor belts and wringer rolls.

In the form of apparatus illustrated in the drawings, 1 indicates a tank or container for the bath of acid through which the material to be nitrated, hereinafter referred to as cotton, is passed. The tank may be made of ferro-concrete, vitrified terra cotta, duro iron or other metal as desired. The cotton is fed into the tank at one end, passes through the mixed acid bath and is nitrated, is then subjected to squeezing or wringing mechanism which removes a large part of its moisture content, and finally is delivered at the other end of the tank into the quenching sump. The tank is preferably tightly covered by sheet metal plates 2 one of which, preferably located about midway of the apparatus, is provided with a vent or opening that communicates with the housing 3 of an exhaust fan whose shaft 4 may be conveniently driven by an electric motor 5. The acid fumes thus exhausted from the tank are preferably blown up a large stack (not shown) and may be condensed and collected for reclamation in a well known manner. In order to prevent the escape of acid fumes and to facilitate their exhaustion from parts of the tank remote from the exhaust opening and fan, the intake and the delivery outlets of the tank 1 are both preferably inclosed. For this purpose the tank may be conveniently provided at its delivery end with a conduit in the form of a hopper 6 which extends into the quenching sump 7 and through which the nitrated cotton is delivered from the tank to the sump. At the opposite end of the tank 1 the intake for the purified cotton linters is preferably a hopper 8 the outlet opening of which is directly above the space between the two conveyor belts 9, so that the cotton is fed to the belts between the lower segment of the upper belt and the upper segment of the lower belt. By maintaining a sufficient quantity of cotton in the hopper 8 the escape of acid fumes at this point may be practically obviated; but to insure against the escape of fumes should the quantity of cotton in the hopper become low, as well as to be able to save and utilize the cotton dust, it is preferred to have the cotton drying machine so placed that its belt conveyor 10 will extend to the hopper through a flexible chute 11 closely secured to the mouth thereof.

As illustrated in Figure 10, the belts 9 by which the cotton is carried through the acid bath and through the wringer rolls 12 may be and preferably are of reticulated construction consisting of interwoven bars and wires both of which are of aluminum. Each belt conveyor passes around a series of revoluble supports 13 which are journaled in bearing boxes 14 located at the sides of the tank. As illustrated in Figure 5, each revoluble support 13 may conveniently consist of a shaft $13^a$ to which flanged sprocket wheels $13^b$ are secured near the ends thereof and which is provided at intervals with other sprocket wheels $13^c$. The teeth of the sprocket wheels $13^b$ and $13^c$ engage the transversely extending bars of the respective conveyor belts 9, and one of the sprocket supports 13 in each series is driven by suitable mechanism to cause the upper segment of the lower belt and the lower segment of the upper belt to travel in unison in the same direction from the intake toward the delivery end of the tank. A simple way of thus driving the revoluble sprocket devices 13 is to extend the shafts $13^a$ of two adjacent sprocket devices 13, one in each series, through the side wall of the tank 1 (see Figure 2), and to provide said shafts with meshing pinions 15, one of said shafts $13^a$ being prolonged sufficiently to be driven by an electric motor (not shown) or other suitable source of power.

The sprocket members 13 of the two series are preferably arranged in pairs and spaced apart in accordance with the quantity or depth of the cotton that is being carried through the acid between the belts. By this means, as will readily be appreciated upon reference to Figures 4 and 11, the cotton while submerged in the acid is alternately squeezed and allowed to expand, thus increasing the accessibility of the cotton to the acid and thereby decreasing the period of time required for a given degree of nitration. In order to allow the squeezing of the submerged cotton to be effected by utilizing the weight of the upper sprocket members 13 for that purpose, as well as to permit them to yield upwardly or to be adjusted in any desired spaced relation with respect to the corresponding sprocket members of the lower series, the upper bearing boxes 14 of the intermediate sprocket members of the upper series are slidably mounted in upwardly extending flanged guides 16 secured to the inner faces of the side walls of the tank 1, each of said boxes being for that purpose provided with a plate or flange member 14$^a$ adapted to fit in its corresponding guideway. The lower bearing boxes 14 are stationary, being secured to the side walls of the tank 1, and each is preferably provided with an upwardly extending projection or tongue 14$^b$ upon which the plate or flange portion 14$^a$ of the neighboring upper bearing box 14 is adapted to rest. By this construction the approach of the sprocket members 13 of the upper series toward those of the lower series is limited, and provision is made for allowing the sprocket members to separate as may be required to accommodate the body of cotton that is being conveyed by the endless belts 9.

The sprocket members 13 of the pair in proximity to the hopper 8 at the intake end of the apparatus are preferably arranged in horizontal alinement and spaced sufficiently far apart to insure the reception between the belts 9 of the cotton delivered into the tank from the hopper. The sprocket members 13 adjacent the quenching sump outlet 6 at the delivery end of the tank 1 are preferably adjustable for the purpose of taking up excessive slack in the conveyor belts 9. This adjustment may be provided for by slidably mounting the bearing boxes 17 of these sprocket members in longitudinally extending guides 18 secured to the side walls of the tank 1, and by employing adjusting rods 19 having threaded engagement with lugs 18$^a$ formed on the respective guides 18 and bearing against the corresponding bearing boxes 17.

As illustrated in Figures 1, 3 and 4 of the drawings, the sprocket members 13 at the ends of the apparatus are located at a proper height to cause the belts 9 to convey the cotton into the acid bath at one end, through said bath and out of it at the other end. The portion of the tank containing the acid is preferably provided with a lining 1$^a$ of concrete or other material on which the acid has little or no effect. If desired the bottom of the tank 1 may be provided with longitudinally extending metallic rails or supports 1$^b$, as shown in Figure 5, for protecting the lower belt 9 from abrasion by the concrete lining of the bottom of the tank.

The conveyor belts are operated at a speed which is determined by the term of nitration and the distance the cotton travels in passing through the acid. Thus, if a twenty minutes term of nitration is desired and the adjacent segments of the conveyor belts are submerged in the acid for sixty feet, the conveyors will be operated at a speed causing them to travel three feet per minute.

Somewhat beyond the point where the cotton emerges from the acid bath the tank 1 is provided with a transversely extending opening 20 which serves as an overflow limiting the maximum depth of the acid in the tank and also as a drain outlet for the spent acid expressed from the cotton in the wringing operation. This spent acid drain outlet and tank overflow 20 is connected by a pipe or conduit 21 with a pipe 22 (see Figure 1) opening into the bottom of the acid bath portion of the tank 1 and forming the main drain outlet thereof. By opening a cock 23 which is located in the pipe 22 between its junction with the pipe 21 and its point of communication with the tank, the acid may be completely drained from the tank. On the other side of the pipe 21 from the cock 23 the pipe 22 communicates with a pump 24 by which the acid is pumped through a pipe 25 to a spent acid receiving tank, diagrammatically indicated at 26, communicating by a pipe 27 with an acid refortification apparatus or unit which is diagrammatically illustrated at 28. The refortification unit may be of any desired or well-known character. After refortification the acid is delivered through one or more pipes 29 to the strong acid tank 30 from which the mixed nitric and sulfuric acids are supplied to the nitration bath within the tank 1.

The cotton on its way through the apparatus emerges from the acid bath before reaching the spent acid drain outlet and tank overflow 20, thus affording it an opportunity to drain partially before passing to the wringer rolls 12. These wringer rolls, which may be of iron, are located above the maximum level attainable by the acid in the tank 1 and preferably occupy a section of the tank between the last two pairs of sprocket members 13 by which the belt conveyors 9 are driven and guided. Beneath the wringer rolls 12 the tank is provided with means for leading off the spent acid wrung from the cotton, such means preferably being fashioned as a portion 31 of the bottom of the tank inclining downwardly toward the overflow outlet and spent acid drain 20 so as to allow the spent acid to run thereinto.

The wringer rolls 12 are arranged in pairs and the adjacent segments of the conveyor belts 9 carrying the nitrated cotton pass between them. The wringer rolls, which are journaled in frames 32, are preferably placed closely together in order to obtain the maximum wringing effect possible. Instead of depending wholly upon the weight of the wringer rolls for the squeezing pressure for expressing the acid from the cotton, it is preferred to employ springs 33 operatively interposed between the frames 32 in which the rolls are journaled and tending to force the frames 32 and the rolls carried thereby toward each other. To this end the lower frames 32, which are stationarily secured to the tank by means of brackets 34, may be provided with upwardly extending angle brackets 35 between which and the corresponding upper frames 32 the springs are interposed. To support the upper series of rollers 12, as well as to limit the extent to which the rollers of one series may approach those of the other series, the upper frames 32 are preferably suspended by threaded rods 36 having hooked lower ends 36ª extending under the sides of said frames. The rods 36 project upwardly through the top of the tank and are provided at their upper ends with hand nuts 37 by which said rods may be adjusted up or down when desired.

The wringer rolls 12 may be conveniently rotated by the following means: The shaft of each roll may be provided at one end with two sprocket wheels 38. The shafts 38ª of the pair of rolls through which the cotton first passes are extended through the side wall of the tank 1 and one of the sprocket wheels 38 on each shaft is located outside of the tank. On the shafts 13ª of the neighboring pair of sprocket members or revoluble conveyer supports 13 are secured sprocket wheels 39 and from these latter the sprocket wheels 38 on the outside of the tank are respectively driven by sprocket chains 40. As the two shafts 13ª are geared together by the gears 15 and as one of said shafts is driven by power applied thereto, the wringer rolls 12 constituting the first pair are caused to revolve in opposite directions in a manner corresponding to the rotation of the sprocket members 13 by which the conveyer belts 9 are supported and driven. The sprocket wheels 38 inside the tank on the shaft of the first pair of rolls 12 respectively drive the next succeeding pair of rolls through the instrumentality of sprocket chains 40ª which pass around the corresponding sprocket wheels 38 on the respective shafts of the said succeeding rolls. The successive wringer rolls 12 throughout each series are similarly driven one from another by means of sprocket chains 40ª passing around the sprocket wheels 38 carried by the shafts of the several rolls.

In addition to the sprocket wheels 39, each of the shafts 13ª of the pair of initially driven sprocket members 13 may, if desired, be also provided on the outside of the tank 1 with a sprocket wheel 41, said sprocket wheels 41 being respectively connected by sprocket chains 42 with corresponding outside sprocket wheels 43 mounted on the respective shafts 13ª of the adjustable sprocket members 13 located at the delivery end of the tank. By this means the sprocket members 13 around which the conveyor belts 9 pass at the delivery end of the tank may be positively driven instead of being driven by the conveyors themselves.

During its travel through the apparatus the cotton is not exposed to the atmosphere and is protected against the entry of any extraneous substances, so that fume-offs or fires, which are caused by foreign matter in the cotton or by the introduction of a drop of oil or of water in the partially wrung cotton, will be very infrequent. But for the purpose of quickly drowning any possible fume-off or fire a quenching spray system is provided inside of the tank 1 just above the series of wringer rolls 12. This quenching spray preferably consists simply of a series of parallel closely spaced perforated spray pipes 44 running across the tank over the area where the wringing of the cotton is effected, water being supplied to the spray pipes through a supply pipe 45 with which the various spray pipes directly communicate.

Both the temperature and the specific gravity or strength of the acid bath in which the cotton is nitrated are preferably controlled by suitable devices through which the acid from the main tank 1 is caused to circulate. Each temperature control unit, two of which are illustrated but any desired number of which may be employed, preferably consists of an auxiliary tank or shell 46 enclosing a coil 47 through which acid from the tank 1 is forced to circulate by means of a centrifugal pump 48 driven by an electric motor 49. The inlet end of the coil 47 receives acid from the tank 1 through a pipe 50, and the outlet end of the coil is connected to the intake of the pump 48 by a pipe 51. The acid passing through the coil and pump is forced through a pipe 52, which, instead of directly returning the acid to the tank 1, preferably delivers into one of the auxiliary tanks 53 containing the valve mechanisms for controlling the volume and specific gravity of the acid in the main tank 1. Each of these auxiliary tanks 53 is in open communication with the portion of the main tank 1 containing the acid, preferably through two pipes 54 and 55, respectively, arranged at different levels so as to promote uniformity of circulation of the acid in the auxiliary tank and insure that the condition of the acid therein shall not materially vary from that of the acid in the main tank 1.

The temperature control tank 46 is provided at one end, preferably adjacent the outlet end of the coil 47, with an inlet pipe 56 and at the other end with an outlet pipe 57. By this means water is allowed to enter the tank 46 and leave the same after circulating around the coil 47. The water circulating through the temperature control tanks may be maintained at the desired temperature by means of individual water heaters one of which is diagrammatically illustrated at 58 in Figure 1 of the drawings. Cold water is supplied to each of these heaters through a supply pipe 59 communicating with a pipe 60 leading to the heater. The heated water leaves the heater 58 through a pipe 51 that communicates with the water inlet pipe 56 of the temperature regulating tank 46. The cold water supply pipe 59 also communicates with the pipe 56, preferably joining the same at the point of juncture of the hot water pipe 61 therewith. A cock 62 is provided for controlling the supply of cold water passing to the heater through the pipe 60; a cock 63 is provided for controlling the supply of hot water passing through the pipe 61; and in the cold water supply pipe 59 between the points of junction of the pipes 60 and 61 therewith a cock 64 is provided for controlling the cold water passing to the inlet pipe 56 of the temperature control tank 46. This allows the temperature of the water passing through the tanks 46 to be readily regulated as desired, the heater being used if necessary.

In the process of nitrating the cotton passing through the apparatus the volume of acid is constantly being reduced. To supply new acid to counterbalance this loss a float and valve mechanism is provided which automatically maintains the acid bath in the main tank 1 at a constant level. This mechanism, one of which is preferably located in each of the auxiliary tanks 53, comprises a valve 65 guarding a port 66 in a valve casing which is in open communication with a pipe 67 that is connected by a pipe 68 to the tank 30 containing strong mixed nitric and sulphuric acids. As shown in Figure 8 the stem 69 of the valve may be guided by the valve casing and by a guide or sleeve 70 secured to the under side of the cover 71 with which the tank 53 is provided. Slidably mounted on the valve stem is a float 72 which may be secured in any position of adjustment by means of a set screw 73. This float and valve mechanism is preferably made of aluminum as such metal well resists the action of the acids. By adjusting the float up or down on the valve stem 69 the level of the acid in the main tank 1, which is in open communication with the tank 53, may be maintained at any desired height, additional mixed acid being admitted from the strong acid tank 30 whenever the acid in the tank 53 recedes below the predetermined level established by the position of adjustment of the float 72 on the valve stem 69.

In the process of nitration the acid is being continually weakened by the water which is formed in the chemical reaction. Restoration or fortification of the acid to normal strength is preferably effected by the admission of fuming sulphuric acid, or strong nitric acid, or a mixture of both, in such quantities as may be necessary. This may be accomplished automatically by the use of valve mechanism which allows the fortifying acid solution to be added to the acid in the main tank 1 whenever the strength or density of the acid in which the material is being nitrated falls below a predetermined point. Like the valve mechanism already described for controlling the volume of the acid in the tank 1, the valve mechanisms for controlling the strength of the acid bath are preferably located in the auxiliary tanks 53, there being one for each tank. Each of these mechanisms comprises a valve 74 guarding a port 75 in a valve casing that communicates through pipes 76 and 77 with the tank 78 containing the acid solution for fortifying the acid in the main tank 1. The stem 79 of this valve may be guided at the lower end by the valve casing and at the upper end by a sleeve or thimble 80 secured to the under side of the cover 71 of the tank. Mounted upon the valve stem, preferably in such position as to serve as a stop for limiting the opening of the valve 74, is a float 81 which may be secured in any position of adjustment by means of a set screw 82. This float, which is submerged in the acid acts as a counterbalance for the valve mechanism and increases its sensitiveness to variations in the specific gravity of the acid in the tank 53. As the pressure of the acid flowing from the tank 78 through the pipes 77 and 76 into the tank 53 has a perceptible lifting effect on the valve 74 it is preferred that the buoyant effect of the float 81 shall be slightly less than the weight of the parts it opposes. By nicely proportioning the buoyant force acting on the float 81 to the weight of the valve parts and the pressure of the inflowing acid the float will sink and allow the valve 74 to open when the density of the acid in the tank 73 falls below the predetermined point and the valve will close when the addition of the fortifying acid has restored the acid in the tank 53 to the normal strength or specific gravity. But in order to eliminate the necessity for such delicacy of adjustment it is preferred to employ an additional float 83 which is slidably mounted on the valve stem 79 between two adjustable collars 84 and 85. This float 83 is provided with air chambers 86 and with pockets 87, shot being placed in the latter to vary the working specific gravity of the float as desired. It is preferred to make the specific gravity of this float equal to or only slightly less than that of the acid of the nitration bath at the desired normal strength. With such a construction a decrease in the density of the acid in the tank 53 beyond the predetermined point allows the float 83 to sink and impose a portion of its weight upon the lower collar 85 secured to the valve stem 79, thus opening the valve 74 and admitting fortifying acid from the pipe 76. When sufficient of this acid has been admitted to restore the density of the acid in the tank 53 to normal the float 83 no longer will press upon the collar 85, so that the valve 74 will be moved to closed position, either by the pressure of the acid in the pipe 76 wholly, or, if the specific gravity of the float 83 is less than that of the acid in the tank, then by such pressure acting in conjunction with the upward pressure exerted against the upper collar 84 on the valve stem when the float 83, upon rising, comes in contact with such collar. This valve mechanism, like that for controlling the quantity of acid in the nitration bath, is preferably made of aluminum. In practice the consumption of acid and the decrease in its specific gravity will be counteracted by the continuous inflow of acids through the control valve mechanisms at a constant or substantially constant rate so that there will be no discernible motion of the valves.

In the operation of the apparatus the acid bath portion of the main tank 1 is filled to the desired level with mixed nitric and sulphuric acids, the temperature control system is regulated to keep the acid bath at a temperature of about forty-five degrees centigrade, and the control valve mechanisms are adjusted to maintain the acid in the tank 1 at constant volume and density. Purified cotton linters may be introduced into the apparatus in any manner desired, but it is preferred to have the belt conveyor 10 of the usual drying oven or steam drier discharge the cotton directly into the hopper 8 at the intake end of the tank 1. Issuing from the feed hopper 8 the cotton is received between the conveyor belts 9 which carry it down into the acid and through the same at the speed required to permit its submergence for the term of nitration. During the period of submergence the cotton is alternately squeezed and allowed to expand, as heretofore described. Upon emerging from the acid bath the cotton between the conveyors is led over the surface of the bath for a short distance allowing a portion of the acid to drain from the cotton back into the nitration bath. The cotton is then carried by the conveyor belts through the series of wringer rolls 12 which subject it to sufficient squeezing to remove about sixty per cent of the moisture content. After leaving the wringer rolls the cotton is carried to the end of the lower conveyor belt 9 and is delivered into the quenching sump inlet 6. Upon passing into the quenching sump 7 the cotton is submerged in water, which arrests the action of the acid by excessive dilution. During these operations the fume exhaust fan is running so as to withdraw the fumes from the tank for reclamation; and the maintenance of the strength and volume of the acid bath in which the cotton is being nitrated is continuous and automatic.

Among the advantages of the invention are the following: The nitration process may be effected with a saving in labor; fume-offs and fires, which are very common in the practice heretofore followed and are a source of serious loss increasing the cost of production, can rarely occur; acid is saved, not only by minimizing losses due to fume-offs and fires, but by rendering fume reclamation practical and economical as well as because less acid is required than the forty pounds now commonly used per pound of cotton; cotton is saved and production cheapened by making possible the nitration of the cotton dust along with the long fiber cotton; the rate of nitration is increased, thus reducing the time of submergence of the cotton in the acid for a given degree of nitration; a uniform product is produced as the result of automatic maintenance of uniform conditions in the acid bath, thus eliminating the necessity of blending the product; the installation of the apparatus is cheap as compared to present installations; and the apparatus is so constructed that repairs and replacements are reduced, with a corresponding saving in expense and decrease in interruptions to the operation of the apparatus.

While the term cotton is employed in the specification and claims it is to be understood as embracing any material that is to be nitrated.

I claim:

1. In nitrating apparatus the combination with means for containing a bath of liquid, of means for passing cotton through said bath, said last named means involving a plurality of endless belts adapted to receive the cotton between them, and means for causing adjacent segments of the said belts to travel in the same direction.

2. In nitrating apparatus the combination with means for containing a bath of liquid, of a pair of reticulated endless belts adapted to receive between them the cotton to be nitrated, a plurality of revoluble members engaging each belt, and means for causing the segments of the belts between which the cotton is received to travel in the same direction, the said revoluble members for one belt being arranged opposite and in spaced relation to the revoluble members for the other belt.

3. In nitrating apparatus the combination with means for containing a bath of liquid, of a pair of endless belts adapted to receive between them the cotton to be nitrated, said belts being provided with transversely extending bars, a plurality of toothed revoluble members some of which engage the said transversely extending bars of one belt and some of which engage the transversely extending bars of the other belt, and means for causing the segments of the belts between which the cotton is received to travel in the same direction.

4. In nitrating apparatus the combination with means for containing a bath of liquid, of a pair of endless belts adapted to receive between them the cotton to be nitrated, a plurality of revoluble members engaging each belt, and means for causing the segments of the belts between which the cotton is received to travel in the same direction, said revoluble members being arranged opposite each other in pairs and the members constituting a pair being relatively movable to vary the space between them.

5. In nitrating apparatus the combination with means for containing a bath of liquid, of means for passing cotton through said bath, said last named means involving a plurality of endless belts adapted to receive the cotton between them, and means for causing adjacent segments of the said belts to travel in the same direction, said adjacent segments of the belts having portions extending into and out of the bath of liquid.

6. In nitrating apparatus the combination with means for containing a bath of liquid, of a pair of endless belts spaced apart and adapted to receive between them the cotton to be nitrated, means for causing the adjacent segments of the said belts to travel in the same direction and convey the cotton into, through and out of the bath of liquid, and means located above the intake ends of said belts for delivering cotton into the space between said belts.

7. In nitrating apparatus the combination with a tank for containing a bath of liquid, of a cotton receiver delivering into the interior of said tank, means for passing through said bath cotton delivered from said receiver, and a conveyor for delivering cotton to said receiver.

8. In nitrating apparatus the combination with a tank for containing a bath of liquid, of a plurality of endless belts adapted to receive between them the cotton to be nitrated and to convey said cotton into, through and out of said bath, a cotton receiver communicating with the interior of said tank, and a belt conveyor for delivering cotton to said receiver.

9. In nitrating apparatus the combination with a covered tank for enclosing a bath of liquid, of means within said tank for reducing the moisture content of cotton after it has been acted on by said bath, and means also within said tank for conveying cotton from said bath to the said means for reducing the moisture content of the cotton.

10. In nitrating apparatus the combination with a tank for containing a bath of liquid, of means for reducing the moisture content of cotton after it has been acted on by said bath, and means for conveying cotton into, through and out of said bath and for thereafter delivering the cotton to the said means for reducing its moisture content.

11. In nitrating apparatus the combination with a covered tank for containing a bath of liquid, of a plurality of wringer rolls within said tank, and a plurality of endless belts within said tank adapted to receive between them the cotton to be nitrated and to convey said cotton into, through and out of said bath and thereafter pass it between said wringer rolls.

12. In nitrating apparatus the combination with a tank for containing a bath of liquid, of means for reducing the moisture content of cotton after it has been acted on by said bath, and means for conveying cotton into, through and out of said bath and for thereafter delivering the cotton to the said means for reducing its moisture content, said tank being provided with a drain outlet and with an incline for causing the liquid extracted from the cotton by the said moisture reducing means to flow into said drain outlet.

13. In nitrating apparatus the combination with a tank for containing a bath of liquid, of a plurality of wringer rolls within said tank, a plurality of endless belts adapted to receive between them the cotton to be nitrated and to convey said cotton into, through and out of said bath and thereafter pass it between said wringer rolls, and means for taking up slack in said belts.

14. In nitrating apparatus the combination with a covered tank for containing a bath of liquid, said tank having at one end a hopper for receiving cotton and delivering it into the interior of said tank and being provided at the other end with a conduit for communicating with a quenching sump, of a plurality of wringer rolls within said tank, and a plurality of endless belts within said tank adapted to receive between them the cotton delivered from said hopper and to convey said cotton into, through and out of said bath and thereafter pass it between said wringer rolls.

15. In nitrating apparatus the combination with a tank for containing a bath of liquid, said tank having an overflow outlet for said liquid, of a plurality of wringer rolls within said tank above and to one side of said overflow outlet, said tank being provided below said wringer rolls with an inclined portion sloping downwardly to said outlet.

16. In nitrating apparatus the combination with a covered tank for containing a bath of liquid, said tank having at one end a hopper for receiving cotton and delivering it into the interior of said tank and said tank being provided at the other end with a conduit for communicating with a quenching sump, of a plurality of wringer rolls within said tank, and a plurality of endless belts within said tank adapted to receive between them the cotton delivered from said hopper and to convey said cotton into, through and out of said bath, thereafter pass it between said wringer rolls and then deliver it into said conduit.

17. In nitrating apparatus the combination with a covered tank for enclosing a bath of liquid, of means within said tank for reducing the moisture content of cotton after it has been acted on by said bath, means for conveying cotton into, through and out of said bath and for thereafter delivering the cotton to said means for reducing its moisture content, and means for exhausting the fumes of the liquid from the interior of said tank.

18. In nitrating apparatus the combination with a covered tank for enclosing a bath of liquid, of a plurality of wringer rolls within said tank, a plurality of endless belts adapted to receive between them the cotton to be nitrated and to convey said cotton into, through and out of said bath and thereafter pass it between said wringer rolls, and means for exhausting the fumes of the liquid from the interior of said tank.

19. In nitrating apparatus the combination with a tank for containing a bath of liquid, of means for conveying the cotton to be nitrated into, through and out of said bath, and means for automatically supplying liquid to said bath.

20. In nitrating apparatus the combination with a tank for containing a bath of liquid, of means within said tank for reducing the moisture content of cotton after it has been acted on by said bath, means within said tank for conveying cotton from said bath to said means for reducing its moisture content, and a quenching spray device within said tank above said means for reducing the moisture content of the cotton.

21. In nitrating apparatus the combination with a tank for containing a bath of liquid, of means for controlling the temperature of said bath, said means involving an auxiliary tank having a conduit therethrough, means for supplying water to said auxiliary tank, and means including pumping mechanism for causing the liquid to be withdrawn from said bath and returned thereto after passing through said conduit in said auxiliary tank.

22. In nitrating apparatus the combination with a tank for containing a bath of liquid, of means for controlling the temperature of said bath, said means involving a heating device and pumping mechanism for causing the liquid to be withdrawn from said bath and returned thereto after passing through said heating device.

23. In nitrating apparatus the combination with a tank for containing a bath of liquid, of a heating device, and means for causing a circulation of the liquid through said bath and said heating device, said last named means including a pump.

24. In apparatus for treating fibrous material the combination with a tank for containing a bath of liquid, of a source of liquid supply communicating with said tank, and automatic valve mechanism for controlling communication between said tank and said source of liquid supply, said valve mechanism involving means responsive to changes in the specific gravity of the said nitrating liquid.

25. In apparatus for treating fibrous material the combination with a tank for containing a bath of liquid, of a source of liquid supply communicating with said tank through an auxiliary tank, an auxiliary tank in open communication with the said tank for containing the bath, and valve mechanism controlling communication between the said source of liquid supply and the auxiliary tank, said valve mechanism being within said auxiliary tank and involving means responsive to changes in the specific gravity of the said liquid.

26. In nitrating apparatus the combination with a tank for containing a bath of liquid, of a source of liquid supply communicating with said tank through an auxiliary tank, an auxiliary tank, means for controlling the temperature of said bath of liquid, means for withdrawing liquid from said bath and causing it to pass through said temperature controlling device to said auxiliary tank, and valve mechanism within said auxiliary tank for controlling communication between the first named tank and said source of liquid supply, said valve mechanism involving means responsive to changes in the specific gravity of the said liquid.

27. In nitrating apparatus the combination with a tank for containing a bath of liquid, of a source of liquid supply communicating with said tank through an auxiliary tank, an auxiliary tank, and automatic valve mechanism for controlling communication between the said source of liquid supply and the first named tank.

28. In apparatus for treating fibrous material, the combination with a tank for containing a bath of liquid, of means for adding liquid to said bath, said means involving automatic valve mechanism adapted to be actuated by changes in the specific gravity of the said liquid.

29. In apparatus for treating fibrous material, the combination with a tank for containing a bath of liquid, of means for automatically maintaining the liquid of said bath at a predetermined specific gravity, said means involving valve mechanism having a float adapted to be submerged in the liquid.

30. In apparatus for treating fibrous material the combination with a tank for containing a bath of liquid, of means for automatically maintaining the liquid of said bath at a predetermined specific gravity, said means involving valve mechanism having a float whose specific gravity does not exceed the predetermined specific gravity of the liquid.

31. In nitrating apparatus, the combination with a tank for containing a bath of liquid, of means for automatically maintaining the liquid of said bath at a predetermined specific gravity, said means involving a valve and a float movably connected to said valve, said float having a specific gravity not exceeding the predetermined specific gravity of the liquid.

In testimony whereof I affix my signature.

HENRY A. KENDALL.